United States Patent
Bergman

(10) Patent No.: US 10,358,096 B2
(45) Date of Patent: Jul. 23, 2019

(54) CLAMPING MEMBER FOR A LOAD CARRIER FOOT

(71) Applicant: Thule Sweden AB, Hillerstorp (SE)

(72) Inventor: Fredrik Bergman, Vaggeryd (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 15/842,358

(22) Filed: Dec. 14, 2017

(65) Prior Publication Data

US 2018/0170270 A1 Jun. 21, 2018

(30) Foreign Application Priority Data

Dec. 20, 2016 (EP) .................................... 16205409

(51) Int. Cl.
| | | |
|---|---|---|
| *B60R 9/058* | (2006.01) | |
| *B60R 9/048* | (2006.01) | |
| *B60R 9/052* | (2006.01) | |
| *B60R 9/045* | (2006.01) | |
| *F16B 2/02* | (2006.01) | |

(52) U.S. Cl.
CPC .............. *B60R 9/048* (2013.01); *B60R 9/045* (2013.01); *B60R 9/052* (2013.01); *B60R 9/058* (2013.01); *F16B 2/02* (2013.01)

(58) Field of Classification Search
CPC ......... B60R 9/052; B60R 9/058; B60R 9/045; B60R 9/048; B60R 9/04; B25B 5/04
USPC ....... 224/315, 319, 321–323, 325, 309, 331; 269/135, 266
See application file for complete search history.

(56) References Cited

U.S. PATENT DOCUMENTS

| | | | | |
|---|---|---|---|---|
| 5,419,479 A | * | 5/1995 | Evels | ................. B60R 9/045 224/309 |
| 5,423,465 A | | 6/1995 | Kauka et al. | |
| 6,681,971 B2 | * | 1/2004 | Laverack | ............... B60R 9/045 224/319 |
| 2002/0125282 A1 | | 9/2002 | Laverack et al. | |
| 2004/0211801 A1 | * | 10/2004 | Barbara | ................. B60R 9/045 224/319 |
| 2015/0232038 A1 | * | 8/2015 | Robertson | ............... B60R 9/052 224/325 |
| 2015/0321618 A1 | | 11/2015 | Almhill et al. | |

FOREIGN PATENT DOCUMENTS

| | | | | |
|---|---|---|---|---|
| EP | 1008490 A1 | 6/2000 | | |
| WO | WO-2014096327 A2 | * 6/2014 | ............. | B60R 9/058 |

OTHER PUBLICATIONS

European Search Report for European Application No. EP 16205409, dated Feb. 17, 2017 (2 pages).
European Examination Report for European Application No. EP 16205409.2, dated Mar. 7, 2017 (3 pages).

* cited by examiner

*Primary Examiner* — Scott T McNurlen
(74) *Attorney, Agent, or Firm* — Sterne, Kessler, Goldstein & Fox P.L.L.C.

(57) ABSTRACT

A clamping member for a load carrier foot clamping mechanism includes a clamping mechanism and a discontinuous contact portion. The clamping mechanism is configured to couple a load carrier foot to a continuous supporting portion of a vehicle. The discontinuous contact portion has at least two contact sections arranged at an obtuse angle and configured to contact the supporting portion so that the clamping member is usable for supporting portions arranged at different angles.

15 Claims, 5 Drawing Sheets

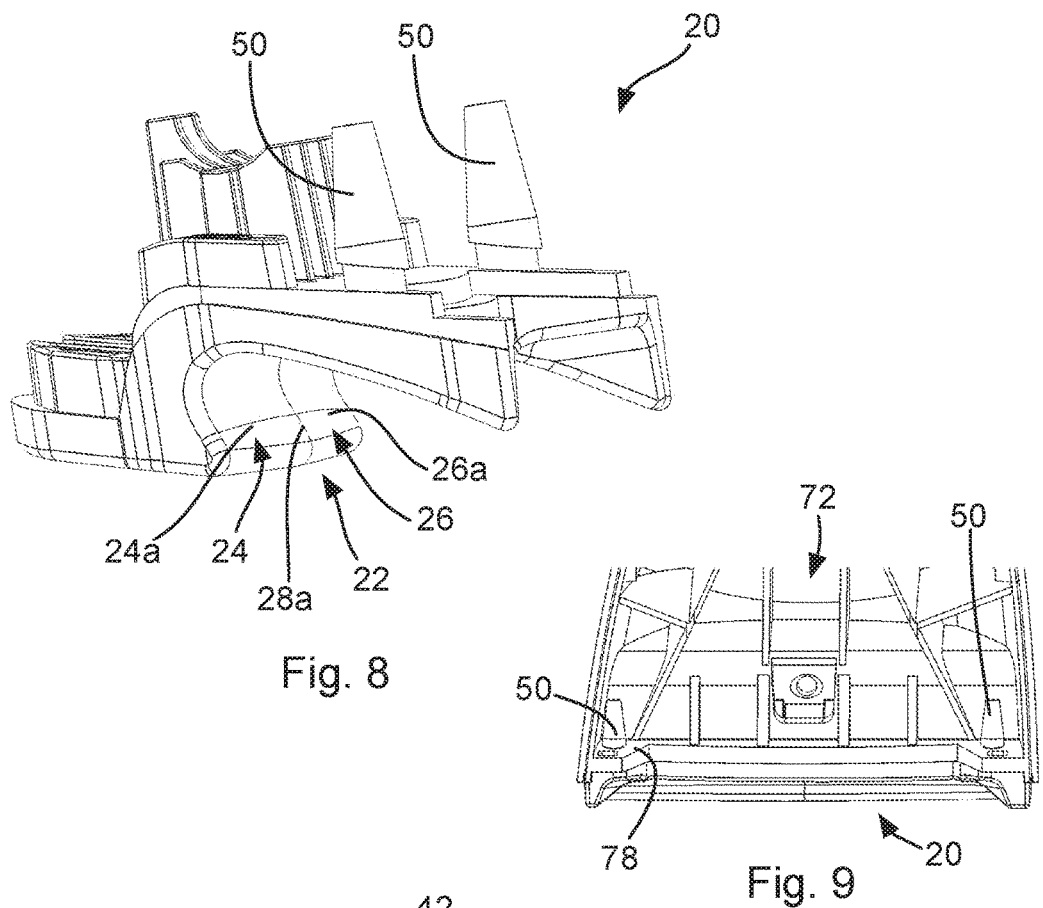
Fig. 8
Fig. 9
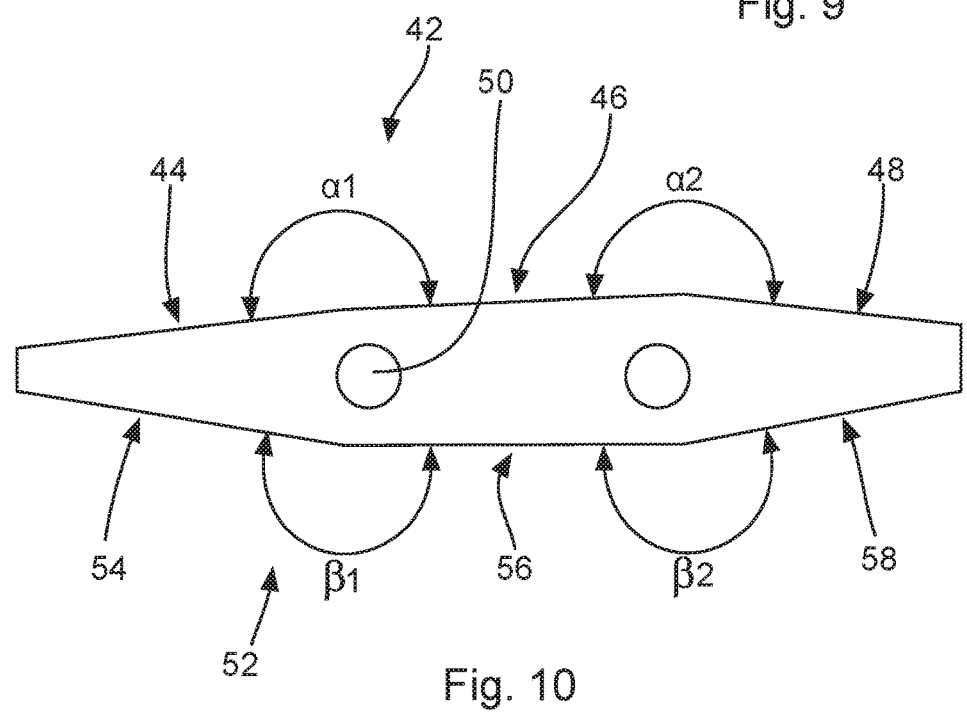
Fig. 10

CLAMPING MEMBER FOR A LOAD CARRIER FOOT

CROSS REFERENCE TO RELATED APPLICATION

This application claims foreign priority to EP Application No. 16205409.2, filed Dec. 20, 2016, which is hereby incorporated herein in its entirety by reference.

TECHNICAL FIELD

The present invention relates to a clamping member for a load carrier foot, a load carrier foot, a load carrier system as well as to a vehicle comprising a load carrier system.

BACKGROUND

Roof mountable load carriers are widely known in the art. Such load carriers typically comprise a crossbar and two load carrier feet for coupling the crossbar to the roof of a vehicle. For that purpose, many vehicles comprise a roof rail system consisting of two roof rails symmetrically arranged with respect to a centerline of the vehicle when viewed from above and primarily extending in the longitudinal direction of the vehicle.

Such roof rails are, however, vehicle and car manufacturer specific. Thus, load carrier feet need to be adapted to the shape and the orientation of the roof rails or other supporting members in order to achieve best fit and, consequently, highest safety. Stated differently, the load carrier feet have to be adapted to each specific car model. The production of kit parts or load carrier foot components for adapting the load carriers to respective car models is very cost intense due to the variety of different car models and roof rail shapes and, consequently, a drawback for manufacturers.

Accordingly, it is desirable to at least address the foregoing and it is the object of the invention to provide an enhanced clamp member for a load carrier foot.

In addition, other desirable features and characteristics will become apparent from the subsequent summary and detailed description, and the appended claims, taken in conjunction with the accompanying drawings and this background.

SUMMARY

The object of the invention is solved by a clamping member according to claim 1. Advantageous further formations are set out in the dependent claims.

Described in a first aspect of the present invention is a clamping member for a load carrier foot clamping mechanism which is adapted to couple a load carrier foot to a continuous supporting portion of a vehicle, preferably a continuous portion of a roof rail of a vehicle. The clamping member comprises a discontinuous contact portion having at least two contact sections arranged at an obtuse angle so that the clamping member is usable for supporting portions arranged at different angles.

The continuous supporting portion can be any suitable portion of the vehicle body including roof portions or roof rails or at least sections of a roof or a roof rail. In the context of the present invention, the term "continuous" is not to be understood in strict mathematical sense but rather means that there are no significant changes or deviations in the course of the supporting portion, in particular no abrupt changes in orientation. In other words, the supporting portions are consistent or smooth. Accordingly, continuous supporting portions can be straight portions or portions which are curved in only one direction. An example of a "discontinuous" portion with a surface having a kink or a surface where two adjacent sections meet at an apex or an apex is provided between two adjacent sections so that an angular orientation of the adjacent sections changes within a relatively short distance. Such an apex can be formed curved or acute.

The contact sections are arranged at an obtuse angle. More precisely, the angle spanned between the contact sections is greater than 180° and can thus also be referred to as reflex angle. Accordingly, if the contact sections are flat surfaces and one of the contact sections is placed on a flat support the other contact section would be arranged at an angle with respect to the flat support. With such a construction, only one contact section can be brought into contact with the supporting portion at the same time. In other words, due to the above described discontinuous portion formed by contact sections arranged at an obtuse angle, it is not possible to bring both contact sections into contact with the continuous supporting portion. Accordingly, the clamping member is adapted to a specific configuration or orientation of a continuous supporting portion such that only one of the contact sections will contact the supporting portion in the mounted condition.

The clamping member is usable for supporting portions arranged at different angles, in particular at different angles with respect to a longitudinal direction of the vehicle. Thus, the clamping member is adapted to differently oriented supporting portions. From a manufacturing standpoint, this has the beneficial effect that a clamping member which is usable with differently oriented or shaped supporting portions can be manufactured with one tool or mold. The clamping member can be cast or injection-molded for instance. Accordingly, the number of clamping members which need to be manufactured for various car models can be reduced by combining the function of two or more clamping members in one clamping member.

According to an embodiment of the present invention, the at least two contact sections are arranged in a primary extension direction of the clamping member, wherein the primary extension direction is substantially parallel to a longitudinal direction of the vehicle in a clamping condition.

In a further embodiment of the present invention, the contact sections comprise an equal predetermined length.

According to a further advantageous embodiment of the present invention, the clamping member comprises three contact sections arranged in series in the primary extension direction of the clamping member, wherein each of the three contact sections is arranged at an obtuse angle with respect to an adjacent one of the contact sections. In this way, the clamping member is adapted to three differently oriented supporting sections.

In a further advantageous embodiment, each of the at least two contact sections comprises a surface formed at least partially straight and/or at least partially curved in a direction different from the primary extension direction of the clamping member. For example, the surfaces can meet at an apex line and can be arranged at an obtuse angle. The apex line can be curved and/or can have straight sections. Thus, the contact portion can be formed saddle-like with an apex line as central guide curve and two lateral surfaces extending therefrom in opposite direction as side or leg surfaces.

According to a further embodiment of the present invention, the clamping member further comprises a discontinuous secondary contact portion for contacting the supporting portion, wherein the contact portion and the secondary contact portion are provided on opposite sides of the clamping member with respect to the primary extension direction.

In a further preferable embodiment of the present invention, the secondary contact portion comprises at least two secondary contact surfaces, preferably three secondary contact surfaces, arranged at an obtuse angle.

According to a further preferable embodiment, the clamping member comprises a coupling portion which is configured such that the clamping member is reversely mountable in the clamping mechanism in order to render the secondary discontinuous contact portion operative. In the context of the present invention, a contact portion is operative when it is arranged such that it faces towards a supporting portion in a mounted condition. With such a configuration, the number of different supporting portions for which the clamping member is usable is further increased.

According to a further aspect a load carrier foot is provided which comprises a clamping mechanism adapted to couple the load carrier foot to a continuous supporting portion of a vehicle, preferably a continuous portion of a roof rail of a vehicle, wherein the clamping mechanism comprises at least two clamping members forming a clamping space for accommodating the continuous supporting portion between the same, wherein a first clamping member of the at least two clamping members is movable in a first direction towards and away from a second clamping member of the at least two clamping members, and wherein the second clamping member is configured as a clamping member as described before.

In a preferable embodiment, the first clamping member comprises a straight contact section limiting the clamping space on one side.

According to a further embodiment of the present invention, the clamping mechanism comprises a movable clamping member support wherein the first clamping member is mounted on the movable clamping member support.

In an advantageous embodiment, the second clamping member is non-movably mounted on a stationary foot portion and the first clamping member is mounted on the movable clamping member support pivotably about a pivot axis such that the first clamping member is able to move between different clamping states in which the contact section faces different contact sections of the second clamping member.

According to a further aspect, a load carrier system is provided which comprises two load carrier feet as described before, wherein the load carrier feet are coupled to opposite ends of a load carrier bar, wherein the load carrier feet are preferably configured such that the stationary foot portions are arranged on inner sides of the load carrier feet.

According to a further aspect, a vehicle is disclosed which comprises a roof rail system with two roof rails mounted on opposite lateral sides of a roof of the vehicle, wherein each of the roof rails comprises a mounting area for fixing a load carrier foot, wherein the mounting area is provided at a predetermined position in the longitudinal direction of the vehicle, wherein the mounting areas are arranged at predefined angles with respect to a longitudinal vertical plane of the vehicle and are arranged symmetrically with respect to that plane, and further comprises a load carrier system as described before and which is mounted to the roof rails, wherein only one of the at least two contact sections or contact surfaces in each load carrier foot contacts a respective mounting area.

According to a further embodiment of the present disclosure, the contact section or contact surface of each load carrier foot contacting a roof rail is arranged substantially parallel with the respective mounting area when the load carrier system is mounted on the vehicle with the load carrier bar extending in lateral direction of the vehicle.

Additional features and advantages may be gleaned by the person skilled in the art from the following description of exemplary embodiments, which are not to be construed as limiting, however, drawing reference to the attached drawings.

BRIEF DESCRIPTION OF THE DRAWINGS

The present invention will hereinafter be described in conjunction with the following drawing figures, wherein like numerals denote like elements, and:

FIG. 8 shows the clamping member of FIG. 7 in a perspective view;

FIG. 9 shows the clamping member of FIGS. 7 and 8 in a mounted condition; and

FIG. 10 shows a schematic outline of an alternative clamping member.

All figures are only schematic depictions of exemplary embodiments in which, in particular, distances and dimensional correlations are not presented to scale.

DESCRIPTION OF EMBODIMENTS

The following detailed description is merely exemplary in nature and is not intended to limit application and uses. Furthermore, there is no intention to be bound by any theory presented in the preceding background or summary or the following detailed description.

Figure 1:
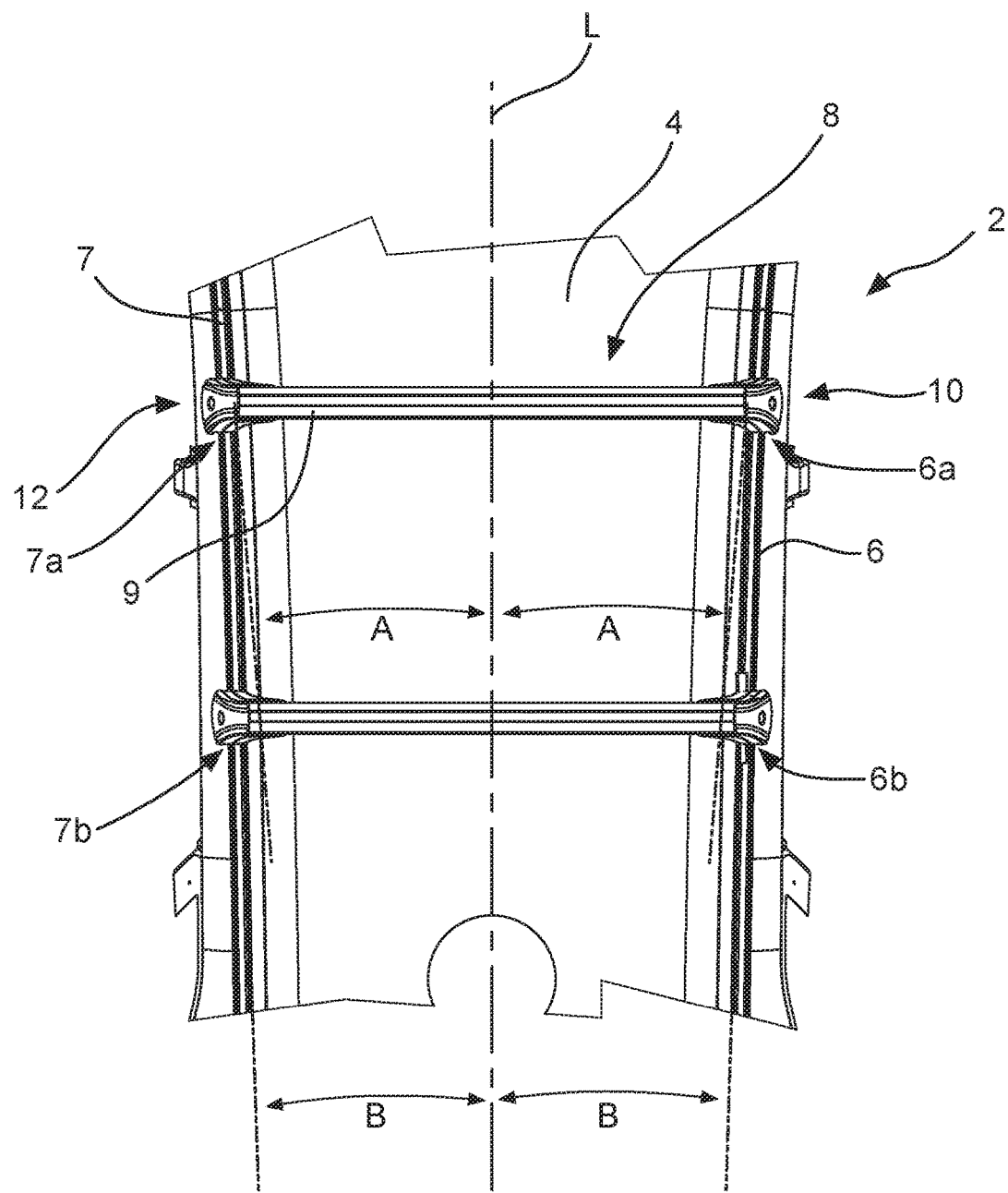
FIG. 1 shows a top view of a roof of a vehicle comprising a load carrier system.

FIG. 1 shows a top view of a vehicle 2, more precisely a top view of a roof 4 of the vehicle 2. A load carrier system 8 is installed on the roof 4 of the vehicle 2. The load carrier system 8 comprises two load carrier feet 10, 12 and a crossbar 9, also called load carrier bar, arranged in transverse direction of the vehicle 2. The load carrier feet 10, 12 couple the crossbar 9 to roof rails 6, 7 of a vehicle roof rail system. The roof rails 6, 7 are fixedly attached on the roof 4 of the vehicle 2 and primarily extend in the longitudinal direction of the vehicle 2. In other words, the primary extension direction of the roof rails 6, 7, i.e. the direction in which the roof rails have the greatest dimension, is the longitudinal direction of the vehicle 2. The roof rails 6, 7 are formed and arranged substantially symmetrically with respect to a vertical middle plane of the vehicle 2 which is indicated in FIG. 1 by means of a dot and dash line L, which also corresponds to a centerline.

The shape of each roof rail 6, 7 is usually adapted to the shape of the roof 4, i.e. each roof rail 6, 7 can be formed to substantially follow an edge contour of the roof 4. Generally, the roof rails may be straight or may comprise a curved shape. In FIG. 1, the roof rails 6, 7 are slightly curved and formed such that the rear end or rear portion of the roof rail is closer to the middle plane L than the front end or front portion. Other configurations are possible including a configuration in which a middle portion of each roof rail 6, 7 is closest to the middle plane L.

The roof rails 6, 7 comprise mounting areas 6a, 6b, 7a, 7b for mounting load carrier feet 10, 12 on the roof rails 6, 7, that is to say portions where the load carrier feet 10 are to be mounted. Such portions can be marked by applying suitable indications on the roof rails 6, 7 such as small indents in order to allow a user to easily identify the mounting areas. Depending on the shape of the roof rails 6, 7, these mounting areas 6a, 6b, 7a, 7b are arranged parallel with or at a specific angle to the longitudinal direction of the vehicle 2. In the present embodiment, the mounting areas 6a, 6b, 7a, 7b are arranged at respective angles to the centerline and imaginary extension lines of the mounting areas 6a, 6b, 7a, 7b, here of an inner contour of the mounting areas 6a, 6b, 7a, 7b, intersect the middle plane L at specific points. Since the roof rails 6, 7 are substantially symmetrically formed with respect to the centerline or middle plane L, the extension lines of front mounting areas 6a, 7a intersect the centerline or middle plane L at the same point and the extension lines of the rear mounting areas 6b, 7b intersect the centerline or middle plane L at the same point. In the configuration as shown in FIG. 1, the intersection points (not shown) are located on the lower side of the vehicle roof 4, more precisely behind the vehicle 2. Following the definition in automotive engineering, an angle of the mounting areas where the front end of the mounting areas 6a, 6b, 7a, 7b, i.e. the respective upper end in FIG. 1, points away from the centerline or middle plane L is called toe-out or negative toe wherein an angle of the mounting areas 6a, 6b, 7a, 7b in which the front ends point towards the centerline line is called toe-in or positive toe. In FIG. 1, all mounting areas 6a, 6b, 7a, 7b are arranged toe-out. However, it is to be noted that the mounting areas can be arranged differently, e.g. such that front mounting areas 6a, 7a are arranged toe-out and rear mounting areas 6b, 7b are arranged toe-in. It is even possible to have both mounting areas arranged toe-in. The arrangement of the mounting areas depends on the shape of the roof rails of the vehicle.

As is further shown in FIG. 1, front mounting areas 6a, 6b are respectively arranged at a front angle A with respect to the middle plane L or centerline and the rear mounting areas 7a, 7b are respectively arranged at a rear angle B with respect to the middle plane L or centerline. In the present configuration, rear angle B is smaller than front angle A.

As already mentioned above, the crossbar 9 extends substantially perpendicular to the centerline or middle plane L and, consequently, the respective load carrier feet 10, 12 have to be able to fix the crossbar 9 on the mounting sections of the roof rails such that the orientation of the crossbar 9 is maintained. Accordingly, each crossbar 9 has to be arranged at a specific angle with respect to the respective mounting area. In other words, the load carrier feet 10, 12 have to be configured such that they can establish a suitable contact with the mounting sections.

Figure 2:
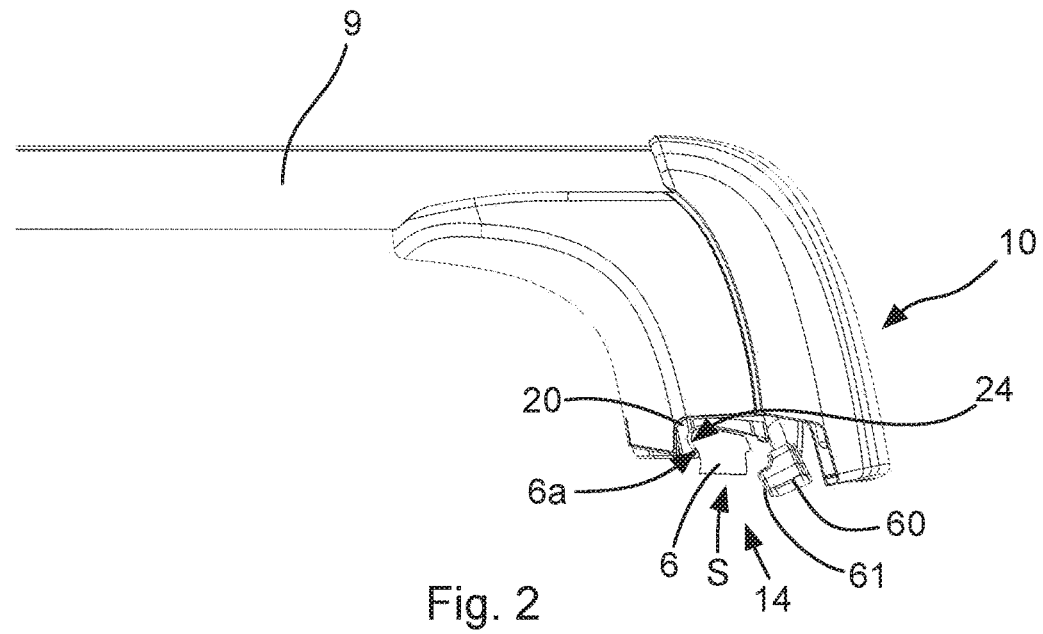
FIG. 2 shows a rear view of a load carrier foot.
Figure 3:
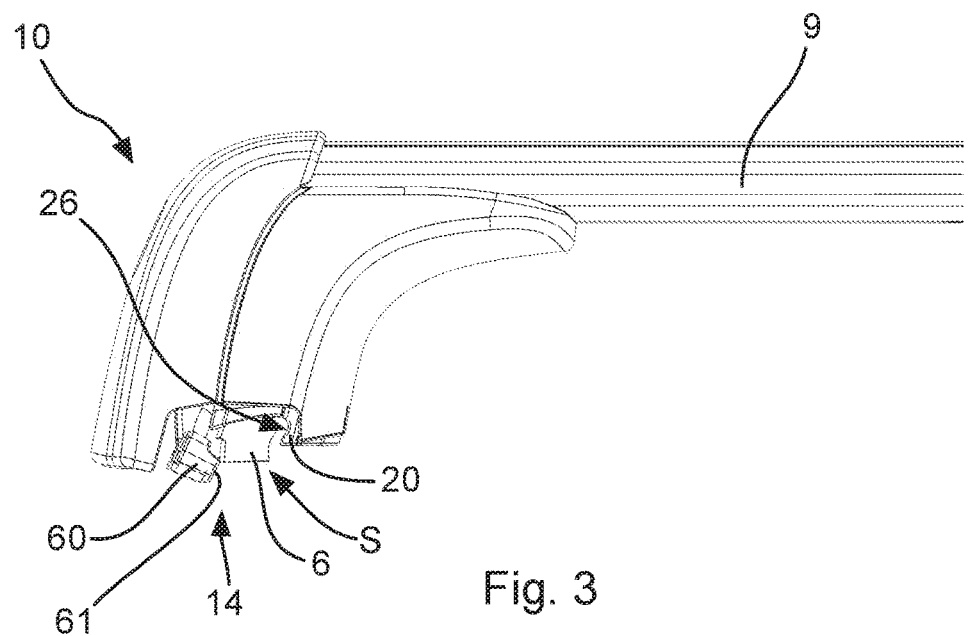
FIG. 3 shows a front view of the load carrier foot of FIG. 2.

For coupling purposes, each load carrier foot 10, 12 comprises a clamping mechanism 14 for fixing the load carrier foot 10, 12 on the roof rail 6. Each clamping mechanism 14 comprises two clamps or clamping members 20, 60 which form a clamping space S for accommodating a portion of one of the roof rails 6, 7. In FIGS. 2 and 3, a configuration is shown in which the roof rail 6 is accommodated in the clamping space S of the load carrier foot 10. FIGS. 2 and 3 show the load carrier foot 10 of FIG. 1, i.e. the right load carrier foot of the front load carrier system. Furthermore, FIG. 1 shows the load carrier foot 10 from the rear side whereas FIG. 3 shows the clamping member as viewed from the front side of the vehicle 2.

One of the clamping members 20, 60 is movable towards and away from the other clamping member in order to be able to reduce the distance between the clamping members for clamping the roof rail 6, 7 between the clamping members 20, 60. In the configuration as shown in the drawings, the outer clamping member 60, i.e. the clamping member which is located on the laterally outer side of the roof rail 6 or on a side of the roof rail 6 facing away from the middle plane or centerline, is movable with respect to the inner clamping members 20 arranged on the opposite side of the roof rail 6. In FIGS. 2 and 3, the clamping mechanism 14 is shown in an open state allowing an insertion of the roof rail 6 in the accommodating space S. The clamping mechanism 14 will be described in greater detail below.

The inner clamping member 20 is non-movably held in the load carrier foot 10 and is preferably made from a substantially rigid material. The inner clamping member 20 comprises two contact sections 24, 26 which are arranged at an obtuse angle and, consequently, do not both contact roof rail 6 at the same time. In the state as shown in FIGS. 2 and 3, contact section 24 is in contact with the roof rail 6 and contact section 26 is not in contact with the roof rail 6. In other words, the contact sections 24, 26 are configured such that contact section 24 which is the rear contact section in the present configuration is in contact with the inner surface of the mounting section 6a whereas contact section 26 is out of contact with the mounting section 6a. Thus, when the roof rail 6 is clamped, it is held between contact section 24 and outer clamping member 60. Stated differently, contact section 24 of the inner clamping member 20 is adapted to the orientation of the mounting section 6a, in particular to the angle A as shown in FIG. 1, whereas contact section 26 is not. In fact contact section 26 is configured to fit to another mounting section, either of the same roof rail or of a different roof rail of a different car. In this way, one and the same load carrier foot can either be usable at different positions of one and the same roof rail or at different roof rails of different vehicles. It follows that by providing a clamping member which is able to contact mounting sections with different angular orientation, the usability of a load carrier foot comprising such a clamping member is enhanced. Furthermore, clamping members providing such a double function can be manufactured using one tool which saves costs compared to prior art systems where each clamping member is designed for only one specific mounting section of a roof rail.

Figure 4:
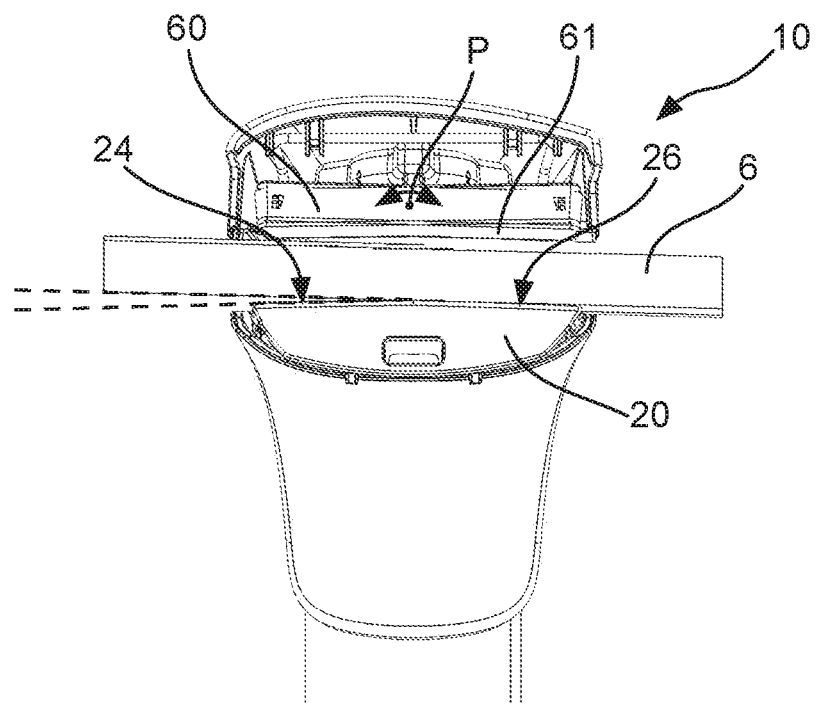
FIG. 4 shows the load carrier foot of FIG. 2 from below and arranged on a roof rail oriented with a specific angle.
Figure 5:
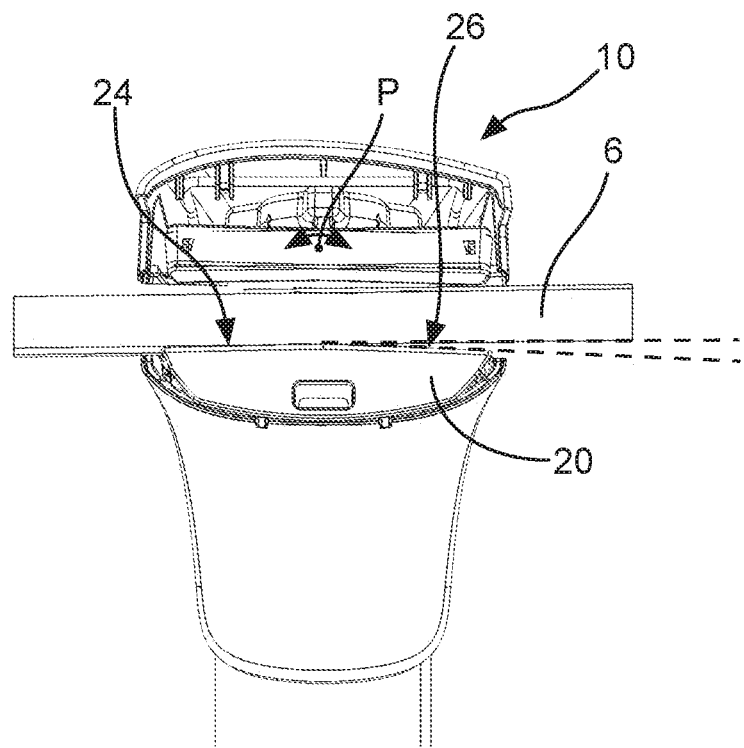
FIG. 5 shows the load carrier foot of FIG. 2 from below and arranged on a roof rail oriented with another angle.

FIGS. 4 and 5 illustrate the enhanced usability of the above described load carrier foot 10 comprising an inner clamping member 20 configured in the above-described manner.

FIG. 5 corresponds to a mounting state of the load carrier foot 10 as shown in FIGS. 2 and 3, i.e. to a mounting state where the load carrier foot 10, in particular the inner clamping member 20, is in contact with the roof rail 6 at mounting section 6a. As is shown, the contact section 24 is in contact with the carrier bar 6 and the contact section 26 is not in contact with the carrier bar 6 as indicated by the dashed lines illustrating an angular deviation. The outer clamping member 60 is arranged pivotably about a pivot axis P such that it can align its orientation to the orientation of the roof rail 6. Thus, when the clamping member 60 is brought into contact with the roof rail 6 as shown in FIG. 5, it will rotate in the counterclockwise direction until it is oriented parallel with the outer side of the roof rail 6.

FIG. 4 shows the load carrier foot 10 in a condition where it is mounted to a mounting section having a different orientation compared to the mounting section 6*a* as shown in FIG. 5. In this condition, the roof rail 6 or a portion of the same is inclined compared to the orientation as shown in FIG. 5. In FIG. 4, the roof rail 6 is aligned with the contact section 26 and contacts the same. By contrast, contact section 24 is not in contact with roof rail 6 as it is specifically designed for an angled roof rail section as shown in FIG. 5. Accordingly, the load carrier foot 10 being structured in the above described way is usable in two different conditions. In the embodiment as shown in FIG. 4, the load carrier foot 10 is mounted to the rear mounting portion 6*b*. Thus, the load carrier foot 10 is adapted to fit to both the front mounting portion 6*a* and the rear mounting portion 6*b* of the roof rail 6. Accordingly, load carrier foot 10 can be used at both mounting portions in an optimum way since every contact section is specifically adapted to the orientation of the respective mounting portion. Furthermore, as the outer clamping member 60 is pivotably arranged, it can rotate in the clockwise direction when contacting the roof rail 6 as shown in FIG. 4.

Figure 6:
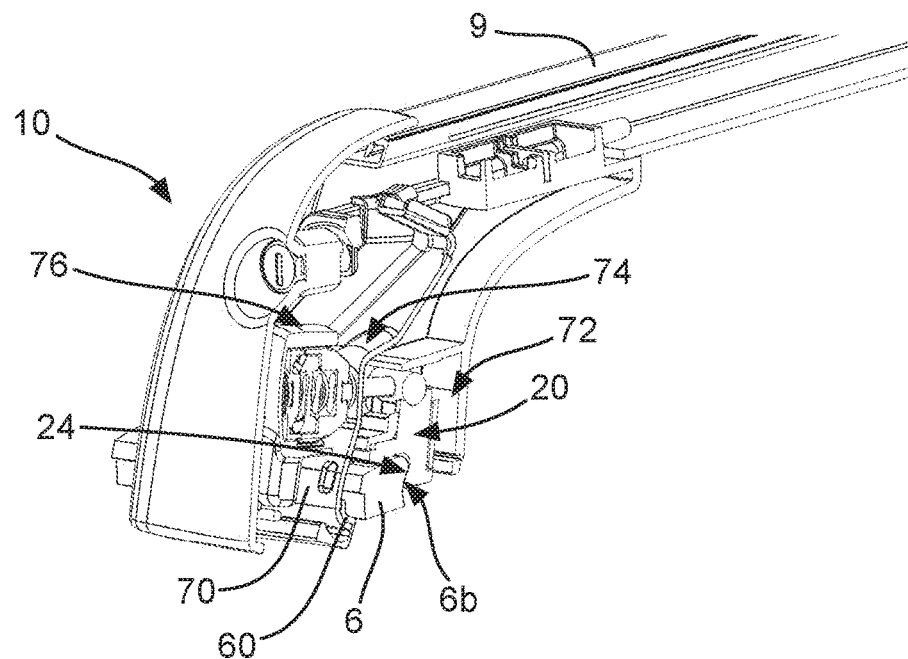
FIG. 6 shows a sectional perspective view of the load carrier foot of FIG. 2.

FIG. 6 shows a sectional perspective view of the load carrier system in a condition where the load carrier foot 10 is mounted on the rear mounting portion 6*b* of roof rail 6. As already described above, contact section 26 contacts the roof rail 6 as is shown in FIG. 6. Furthermore, it can be gathered from FIG. 6 that the inner clamping member 20 is non-movably held on a rigid load carrier foot member 72, also referred to as stationary foot portion, which is also adapted to support the crossbar 9 at its upper end. The outer movable clamping member 60 is movably held on a movable clamping member support 70 which is configured to move the clamping member 60 towards and away from the inner clamping member 20. For that, the clamping mechanism 14 comprises a tensioning mechanism 74 which converts a rotational movement of a knob 76 into a pushing force acting on the movable clamping member support 70.

The configuration of the inner clamping member 20 will be described in detail with reference to FIGS. 7 and 8.

Figure 7:
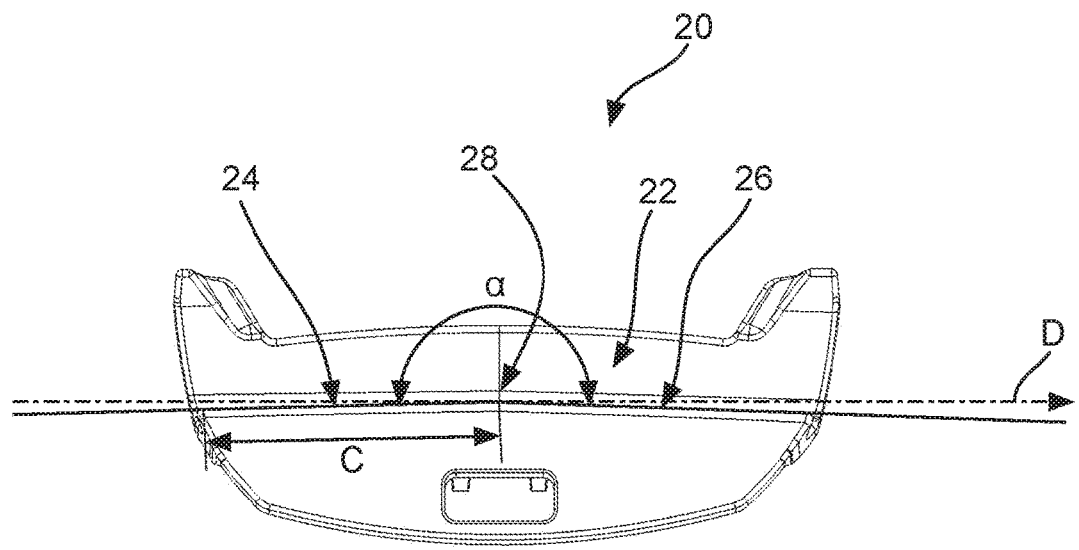
FIG. 7 shows a clamping member according to an embodiment as viewed from below.

FIG. 7 shows the inner clamping member 20 according to the present embodiment as viewed from below. The contact section 24 and the contact section 26 are arranged at an obtuse angle α, more precisely at a reflex angle. In other words, the angle spanned between both contact sections on a side intended to face the roof rail 6 is greater than 180° and smaller than 270°. The contact sections 24, 26 can comprise an equal predetermined length C and are arranged in a primary extension direction D of the clamping member. The primary extension direction D can be parallel to the longitudinal direction of the vehicle 2 in a clamping condition. The contact sections 24, 26 meet at an apex 28 or an apex 28 is provided between the contact sections. Due to the presence of such an apex 28, the contact portion 22 which comprises both contact sections 24, 26 can be considered as discontinuous. The apex 28 can be formed curved or acute.

As is shown in FIG. 8, each of the contact sections comprises a surface 24*a*, 26*a* which is formed following an outer peripheral shape of the roof rail 6 in cross section. In particular, the surfaces 24*a*, 24*b* can be formed at least partially straight and/or at least partially curved in a direction different from the primary extension direction D of the clamping member 20. The surfaces 24*a*, 24*b* meet at an apex line 28*a* and are arranged at the above described angle α at least along a predetermined portion extending in the direction different from the primary extension direction, for example along the apex line 28*a*. In other words, if the clamping member 20 is viewed in a sectional view with a sectional plane which is perpendicular to the apex line 28, the surfaces 24*a*, 26*a* appear as at least partially straight lines which are arranged at angle α with respect to each other. The apex line can be curved as shown in FIG. 8 and/or can have straight sections. The shape of the contact portion 22 according to the embodiment can also be described as saddle-like with the apex line 28*a* as central guide curve and the surfaces 24*a*, 26*a* extending therefrom in opposite directions as side or leg surfaces.

As is also shown in FIG. 8, the clamping member 20 comprises coupling portions 50 for coupling the clamping member 20 to the stationary foot portion 72. FIG. 9 shows a side view of the clamping member 20 in a condition where the clamping member 20 is mounted on the stationary foot portion 72. More precisely, the coupling portions 50 are engaged with corresponding openings formed in a supporting flange 78 of the stationary foot portion 72.

While the above clamping member comprises a rather complex shape or complexly shaped contact sections, such sections could of course have different shapes and could also be flat.

While illustrated and described with respect to a front and a rear portion of one and the same roof rail 6, clamping member 20 can be configured so as to fit to different roof rails of different vehicles. Also in this case, less moulds have to be used as the produced clamping members are adapted to be mounted to at least two differently oriented mounting sections.

A further embodiment of a clamping member is shown in FIG. 10. Contrary to the clamping member as described above, the clamping member as shown in FIG. 10 comprises three contact sections 44, 46, 48 on a first discontinuous contact portion 42 and three contact sections 54, 56, 58 on a secondary discontinuous contact portion 52 wherein the contact sections on each contact portion are arranged in series along a primary extension direction D of the clamping member. Adjacent ones of the contact sections 44, 46, 48 are arranged at obtuse, more precisely reflex angles α1, α2 similar to the angle α as described above.

Furthermore, adjacent ones of the contact sections 54, 56, 58 are arranged at obtuse, more precisely reflex angles β1, β2, similar to the angle α. Furthermore, the clamping member as shown in FIG. 10 is reversely mountable in a clamping mechanism of a load carrier foot as described above in order to selectively render one of the contact portions 42, 52 available. Accordingly, a load carrier foot comprising such a clamping member is adaptable to six differently oriented mounting portions of a roof rail.

In the above embodiments, a roof rail and mounting portions of a roof rail are described as suitable supporting portions of a vehicle. However, it is to be noted that the invention is not limited to roof rails and that other suitable supporting portions of a vehicle, e.g. a portion of the vehicle body like a roof section, can be used instead. In such cases, the clamping member is adapted to such alternative supporting portions.

Moreover, the above embodiment is described with a movable clamping member being an outer clamping member. However, it is also possible to provide the movable clamping member as inner clamping member.

In conclusion, it is pointed out that terms like "comprising" or the like are not intended to rule out the provision of additional elements or steps. Let it further be noted that "a" or "an" do not preclude a plurality. In addition, features described in conjunction with the different embodiments can be combined with each other however desired. It is also noted that the reference numbers in the claims are not to be construed as limiting the scope of the claims. Moreover, while at least one exemplary embodiment has been presented in the foregoing summary and detailed description, it should be appreciated that a vast number of variations exist.

It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A load carrier foot comprising:
a clamping mechanism having a clamping member,
wherein said clamping mechanism is configured to couple said load carrier foot to a continuous supporting portion of a vehicle,
wherein said clamping member comprises a discontinuous contact portion having at least two contact sections arranged at a reflex angle and configured to contact said supporting portion so that said clamping member is usable for supporting portions arranged at different angles,
wherein the at least two contact sections are arranged in a primary extension direction of said clamping member, wherein said primary extension direction is parallel to a longitudinal direction of said continuous supporting portion of said vehicle in a clamping condition, and
wherein the reflex angle is greater than 180 degrees.

2. The load carrier foot according to claim 1, wherein said primary extension direction is parallel to a longitudinal direction of said vehicle in said clamping condition.

3. The load carrier foot according to claim 1, wherein said contact sections comprise an equal predetermined length.

4. The load carrier foot according to claim 1, comprising three contact sections, arranged in series in said primary extension direction of the clamping member, wherein each of said three contact sections is arranged at a reflex angle with respect to an adjacent one of said contact sections.

5. The load carrier foot according to claim 1, wherein each of said at least two contact sections comprises a surface formed at least partially straight or at least partially curved in a direction different from said primary extension direction of said clamping member.

6. The load carrier foot according to claim 1, further comprising a secondary discontinuous contact portion for contacting said supporting portion, wherein said contact portion and said secondary contact portion are provided on opposite sides of the clamping member with respect to the primary extension direction.

7. The load carrier foot according to claim 6, wherein said secondary contact portion comprises at least two secondary contact sections, arranged at a reflex angle.

8. The load carrier foot according to claim 7, wherein said clamping member comprises a coupling portion which is configured such that said clamping member is reversely mountable in said clamping mechanism in order to render said secondary discontinuous contact portion operative.

9. A load carrier foot comprising:
a clamping mechanism configured to couple said load carrier foot to a continuous supporting portion of a vehicle,
wherein said clamping mechanism comprises at least two clamping members forming a clamping space configured to accommodate said continuous supporting portion between the at least two clamping members,
wherein a first clamping member of said at least two clamping members is movable in a first direction towards and away from a second clamping member of said at least two clamping members, and
wherein said second clamping member comprises at least two contact sections arranged at a reflex angle, wherein the reflex angle is greater than 180 degrees, wherein the at least two contact sections are arranged in a primary extension direction of said second clamping member, wherein said primary extension direction is parallel to a longitudinal direction of said continuous supporting portion of said vehicle in a clamping condition.

10. The load carrier foot according to claim 9, wherein said first clamping member comprises a straight contact section limiting said clamping space on one side.

11. The load carrier foot according to claim 10, wherein said clamping mechanism comprises a movable clamping member support, wherein said first clamping member is mounted on said movable clamping member support.

12. The load carrier foot according to claim 11, wherein said second clamping member is non-movably mounted on a stationary foot portion and said first clamping member is mounted on said movable clamping member support pivotably about a pivot axis such that said first clamping member is configured to move between different clamping states in which said contact section faces different contact sections of said second clamping member.

13. A load carrier system comprising:
two load carrier feet according to claim 12,
wherein said load carrier feet are coupled to opposite ends of a load carrier bar, and
wherein said load carrier feet are configured such that said stationary foot portions are arranged on inner sides of said load carrier feet.

14. A vehicle comprising:
a roof rail system with two roof rails mounted on opposite lateral sides of a roof of the vehicle, wherein each of said roof rails comprises a mounting area for fixing a load carrier foot, said mounting area being provided at a predetermined position in a longitudinal direction of the vehicle, wherein said mounting areas are arranged at predefined angles with respect to a longitudinal vertical plane of the vehicle and are arranged symmetrically with respect to said plane, and
a load carrier system according to claim 13 mounted to said roof rails, wherein only one of said at least two contact sections in each load carrier foot contacts a respective mounting area.

15. The vehicle according to claim 14, wherein said primary extension direction is parallel to said longitudinal direction of said vehicle in said clamping condition and said load carrier bar extends in a transverse direction of said vehicle.

\* \* \* \* \*